(12) United States Patent
Pei

(10) Patent No.: US 11,367,126 B2
(45) Date of Patent: Jun. 21, 2022

(54) OUT-OF-STORE PURCHASE ROUTING SYSTEMS, METHODS, AND MEDIA

(71) Applicant: Transform SR Brands LLC, Hoffman Estates, IL (US)

(72) Inventor: Jinxiang Pei, Wilmette, IL (US)

(73) Assignee: Transform SR Brands LLC, Hoffman Estates, IL (US)

(*) Notice: Subject to any disclaimer, the term of this patent is extended or adjusted under 35 U.S.C. 154(b) by 173 days.

(21) Appl. No.: 16/563,357

(22) Filed: Sep. 6, 2019

(65) Prior Publication Data

US 2019/0392507 A1    Dec. 26, 2019

Related U.S. Application Data

(63) Continuation of application No. 14/218,319, filed on Mar. 18, 2014, now abandoned.

(60) Provisional application No. 61/802,790, filed on Mar. 18, 2013.

(51) Int. Cl.
*G06Q 30/00* (2012.01)
*G06Q 30/06* (2012.01)

(52) U.S. Cl.
CPC ..... *G06Q 30/0639* (2013.01); *G06Q 30/0635* (2013.01)

(58) Field of Classification Search
CPC ............ G06Q 30/0639; G06Q 30/0635
USPC ........................................... 705/26.81
See application file for complete search history.

(56) References Cited

U.S. PATENT DOCUMENTS

| | | | |
|---|---|---|---|
| 6,026,375 A | 2/2000 | Hall et al. | |
| 6,880,750 B2 | 4/2005 | Pentel | |
| 8,200,550 B2 | 6/2012 | Altkins | |
| 8,554,694 B1 * | 10/2013 | Ward | G06Q 30/0635 705/330 |
| 8,655,736 B2 * | 2/2014 | Bharadwaj | G06Q 30/0201 705/26.1 |
| 2002/0111881 A1 | 8/2002 | Walker et al. | |
| 2002/0143655 A1 | 10/2002 | Elston et al. | |

(Continued)

FOREIGN PATENT DOCUMENTS

| | | | |
|---|---|---|---|
| CN | 112750015 A | * 5/2021 | |
| WO | WO-0068859 A2 | * 11/2000 | G06Q 10/0837 |

(Continued)

OTHER PUBLICATIONS

Clark & Wright's Savings Algorithm, by Jens Lysgaard, (translated by Michael M. Sorensen), Department of Management Science and Logistics, The Aarhus School of Business, dated Sep. 1997, 8 pages.

Mo et al, "RFID Infrastructure for Large Scale Supply Chains Involving Small and Medium Enterprises.", In: Sustainable Radio Frequency Identification Solutions, Book edited by: Cristina Turcu, ISBN 978-953-7619-74-9, pp. 356, Feb. 2010, INTECH, Croatia, downloaded from sciyo.com.

"More Casual Restaurants trying Curbside Delivery", Horovitz, May 30, 2002, retrieved from http://usatoday30.usatoday.com/money/general/2002/05/31/curbside-dinig.htm.

(Continued)

*Primary Examiner* — Russell S Glass
(74) *Attorney, Agent, or Firm* — McAndrews, Held & Malloy, Ltd.

(57) ABSTRACT

Systems, methods, and media for picking-up and delivering products are disclosed. Some embodiments route shoppers to acquire products for multiple customers orders from multiple suppliers using a variety of transportation modes. The transportation modes may differing maximum weight carrying and volume carrying capacities, maximum vehicle speeds. Moreover, some embodiments may account for a different number vehicles for each transportation mode and may further account for the availability of shoppers and vehicles.

20 Claims, 9 Drawing Sheets

(56) References Cited

U.S. PATENT DOCUMENTS

| | | | |
|---|---|---|---|
| 2004/0068443 A1* | 4/2004 | Hopson | G06Q 30/0635 705/5 |
| 2006/0076397 A1 | 4/2006 | Langos | |
| 2006/0178943 A1 | 8/2006 | Rollinson et al. | |
| 2007/0088624 A1 | 4/2007 | Vaughn et al. | |
| 2007/0106468 A1 | 5/2007 | Eichenbaum et al. | |
| 2007/0138268 A1 | 6/2007 | Tuchman | |
| 2007/0257774 A1 | 11/2007 | Stumpert et al. | |
| 2008/0228600 A1 | 9/2008 | Treyz et al. | |
| 2009/0187488 A1 | 7/2009 | Shamilian | |
| 2009/0281903 A1 | 11/2009 | Blatstein | |
| 2010/0088148 A1 | 4/2010 | Presswala et al. | |
| 2010/0293106 A1 | 11/2010 | Rhoads et al. | |
| 2011/0130129 A1 | 6/2011 | Snyder et al. | |
| 2011/0258058 A1 | 10/2011 | Carroll et al. | |
| 2013/0096966 A1 | 4/2013 | Barnes, Jr. | |
| 2014/0278635 A1* | 9/2014 | Fulton | G06Q 10/063112 705/7.14 |
| 2015/0088780 A1* | 3/2015 | Paul | G06Q 10/08 705/338 |

FOREIGN PATENT DOCUMENTS

| | | |
|---|---|---|
| WO | 2004072762 | 8/2004 |
| WO | 2008014255 | 1/2008 |
| WO | 2011005072 | 1/2011 |

OTHER PUBLICATIONS

"Publix Cancels Curbside Pickup", Jan. 22, 2012, retrieved from http://retailtechnologytrends.com/tag/augmented-reality, p. 8.

"Retro Drive-in with Curbside Pickup", Sep. 18, 2012, retrieved from http://blog.munchery.com/2012/09/retro-drive-in-with-curbside-pickup, p. 1.

"Theory and Methodology—The Savings Algorithm for the Vehicle Routing Problem", European Journal of Operational Research 34 (1988), pp. 336-344.

* cited by examiner

OUT-OF-STORE PURCHASE ROUTING SYSTEMS, METHODS, AND MEDIA

CROSS REFERENCE TO RELATED APPLICATIONS AND INCORPORATION BY REFERENCE

The present application is a continuation of U.S. patent application Ser. No. 14/218,319, filed on Mar. 18, 2014, which claims priority under 35 U.S.C. § 119(e) to U.S. Provisional Application No. 61/802,790, filed on Mar. 18, 2013, the disclosures of which are hereby incorporated by reference.

FIELD OF THE INVENTION

Certain embodiments of the present invention relate to systems, methods, and computer readable media that support the pickup and delivery of products for a customer order. More specifically, certain embodiments of the present invention relate to systems, methods, and computer readable media for vehicle routing with respect to picking-up products for customer orders.

BACKGROUND

Customers commonly visit multiple stores in order to acquire products they wish to purchase. Visiting multiple stores, however, is generally more time consuming than visiting a single store that stocks all products that the customer wishes to purchase. Some companies offer delivery of products in certain limited product categories, such as certain food products that may be selected and paid for online and delivered by vehicles dedicated to delivering products purchased from that particular company (e.g., groceries from Peapod). In such instances, the customer has access only to the inventory carried by that particular company, and must still shop elsewhere for missing products. Furthermore, delivery from such stores generally takes a day or longer. As a result, if a customer desires immediate or near immediate possession of a product, the customer may be forced to visit one or more local merchants in order to find the desired products. However, for customers who are willing to wait, those customers may order from such suppliers and have the desired products shipped via commercial carriers (e.g., U.S. Postal Service, UPS, FedEx, and the like).

Further limitations and disadvantages of conventional and traditional approaches will become apparent to one of skill in the art, through comparison of such systems with some aspects of the present invention as set forth in the remainder of the present application with reference to the drawings.

BRIEF SUMMARY

Systems, methods, and computer readable media directed to routing a variety of vehicles to pickup and deliver products from one or more customer orders are substantially shown in and/or described in connection with at least one of the figures, and are set forth more completely in the claims Advantages, aspects, and novel features of the present invention, as well as details of an illustrated embodiment thereof, will be more fully understood from the following description and drawings.

DETAILED DESCRIPTION

Certain embodiments of the present invention relate to systems, methods, and computer readable media that support the pickup and delivery of products for a customer order. More specifically, certain embodiments of the present invention relate to a system, method, or computer readable medium that route a variety of vehicles and/or shoppers to pickup products of one or more customer orders while accounting for varying constraints of the available vehicles and/or shoppers.

As utilized herein, the terms "exemplary" or "example" means serving as a non-limiting example, instance, or illustration. As utilized herein, the term "e.g." introduces a list of one or more non-limiting examples, instances, or illustrations.

Figure 1:
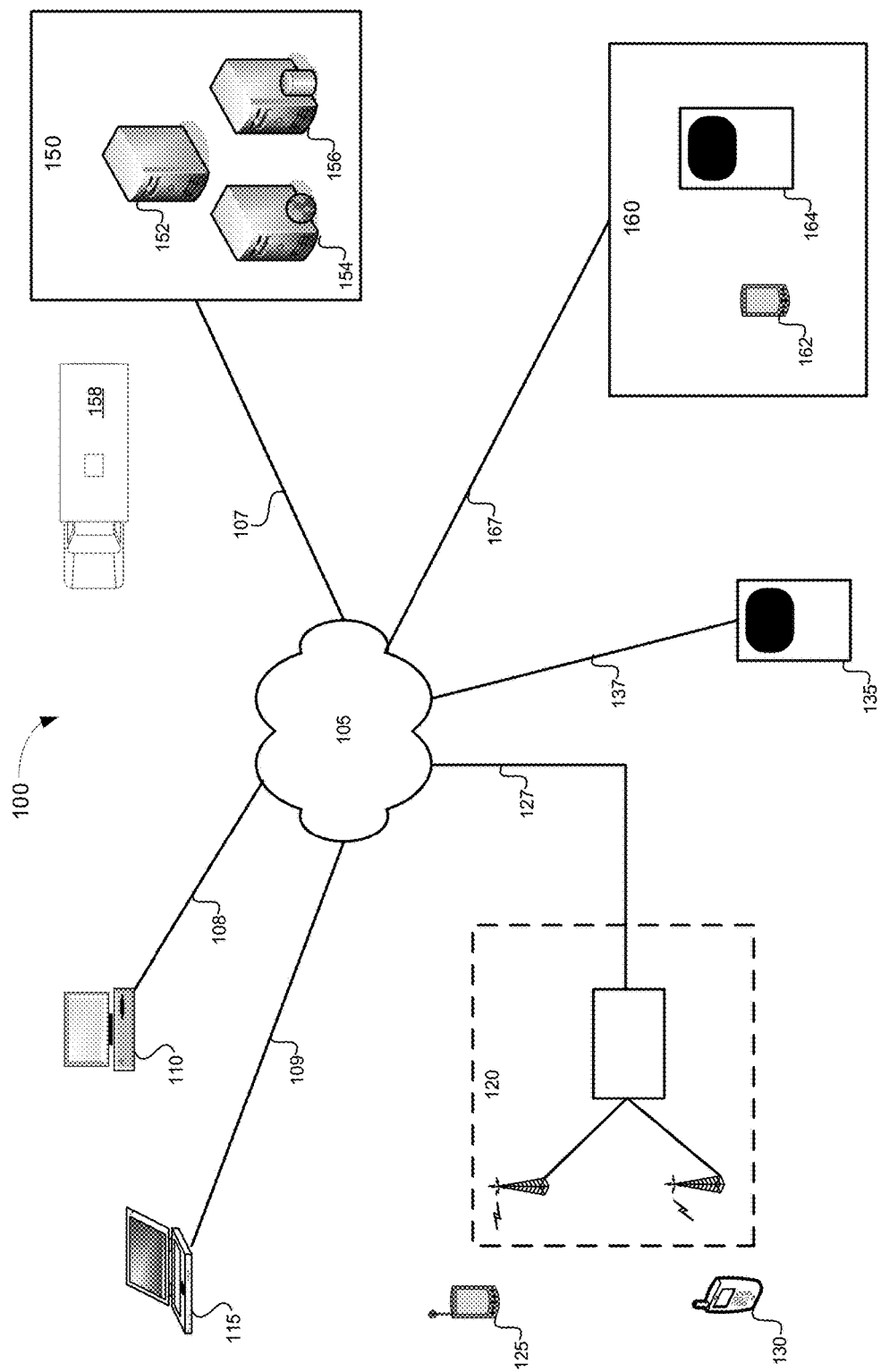
FIG. 1 shows an order fulfillment system in accordance with an example embodiment of the present invention.

FIG. 1 is a block diagram of an exemplary order fulfillment system 100 that incorporates one or more aspects of the present invention. As illustrated in FIG. 1, the system 100 may include an e-commerce platform 150 that comprises one or more web servers 154, one or more database servers 156, and one or more application servers 152. The elements of the e-commerce platform 150 may be interconnected, and may singly or as a group be connected to Internet 105 via communication link 107, which may employ any suitable combination of wired or wireless data communication links.

As shown, the e-commerce platform 150 may further have one or more associated vehicles 158. The vehicles 158 may include vehicles of different modes of transportation (e.g., car, bicycle, truck) that have different weight carrying capacities, different travel speeds, etc. As explained in greater detail below, the e-commerce platform 158 may generate routes for the vehicles 158 in order to acquire products from other stores in order to fulfill customer orders.

The system 100 may also include personal computers (PCs) 110, 115, which are connected to the Internet 105 by communications links 108, 109, respectively, which may be any suitable combination of wired or wireless data communication links. PCs 110, 115 may be any of, for example, a desktop computer, a laptop computer, a notebook computer, a netbook computer, a tablet computer, or any other electronic device having capabilities suitable for accessing the Internet 105 from, for example, a home, a small business, or any private or public area having suitable support for communications links 108, 109.

In addition, the system 100 may further include a user communication device 125 that may comprise, for example, a tablet computer, smart phone, or other handheld electronic device capable of communicating with the e-commerce platform 150 via a wireless network 120, a communication link 127, and the Internet 105. The communication device 125 of FIG. 1 may include suitable software applications, hardware, and logic to permit the communication device 125 to display received web pages and other forms of digital information on a display of the communication device 125, and suitable user interface (UI) elements to permit a user to interact with the e-commerce platform 150 using tactual, speech, and other forms of input. The communication device 125 may be capable of having native applications installed on the communication device from repositories accessible as "app stores," for example.

The wireless network 120 may support communication of digital information using any suitable wireless access technology. For example, the wireless network 120 may include any combination of short-range, long range, Wi-Fi, cellular, personal communication system (PCS), Bluetooth, and/or Near Field communication (NFC) wireless access technologies, to name a few.

The system 100 of FIG. 1 may also include a portable telephone 130 that may be capable of communicating over one or more of a cellular, PCS, Wi-Fi, or other wireless communication network. The portable telephone 130 may have more limited yet sufficient functionality to interact with the e-commerce platform 150 than that available from the PCs 110, 115 and the communication device 125.

In addition, the system 100 of FIG. 1 may further include a kiosk device 135. The kiosk device 135 may permit customers in retail and public venues to access the e-commerce platform 150. The kiosk device 135 may be designed for indoor or outdoor use. The kiosk device 135 may also be linked to the e-commerce platform 150 via a communication link 137 and Internet 105, as shown, or may communicate directly with the e-commerce platform 150 using any other suitable wired or wireless technology. The kiosk 135 may have functionality that is equivalent, greater than, or less than the personal computers 110, 115, the communications device 125, and the cellular telephone 130.

The system 100 may also include a kiosk 164 that may provide customers within a retail establishment 160 with access to the e-commerce platform 150. The retail establishment 160 may be, for example, a "brick-and-mortar" business associated with the operator or sponsor of the e-commerce platform 150 The system 100 may also include a communication device 162 that may belong to, or be loaned to a customer of the retail establishment 160, permitting the customer to, for example, electronically access information about products and/or services available at the retail establishment 160, at other business locations of the operator of the retail establishment 160, or at other businesses operated by, for example, the operator, or businesses that partner with the operator of the e-commerce platform 150. Communication devices within the retail business 160 such as, for example, the communication device 162 and the kiosk 164 may communicate with the e-commerce platform 150 via the Internet 105 and the communication link 167, which may be, for example, any suitable combination of wired and/or wireless communication technologies.

In a representative embodiment, customers may place orders for products with a merchant, in which some of the products may be available from the merchant, and some may not be available from the merchant. This may be due to a product being out-of-stock, or because the merchant simply does not carry a particular product. In a representative embodiment, fulfilling a customer order may entail acquiring some products from the store of the merchant with whom the order was placed. The products acquired from the store of the merchant with whom the order was placed may be referred to herein as "in-store purchases." Fulfilling other products from the customer order may entail acquiring products from sources outside of the store of the merchant with whom the order was placed. The products acquired from sources outside of the store of the merchant with whom the order was placed may be referred to herein as "out-of-store" purchases.

Figure 2:
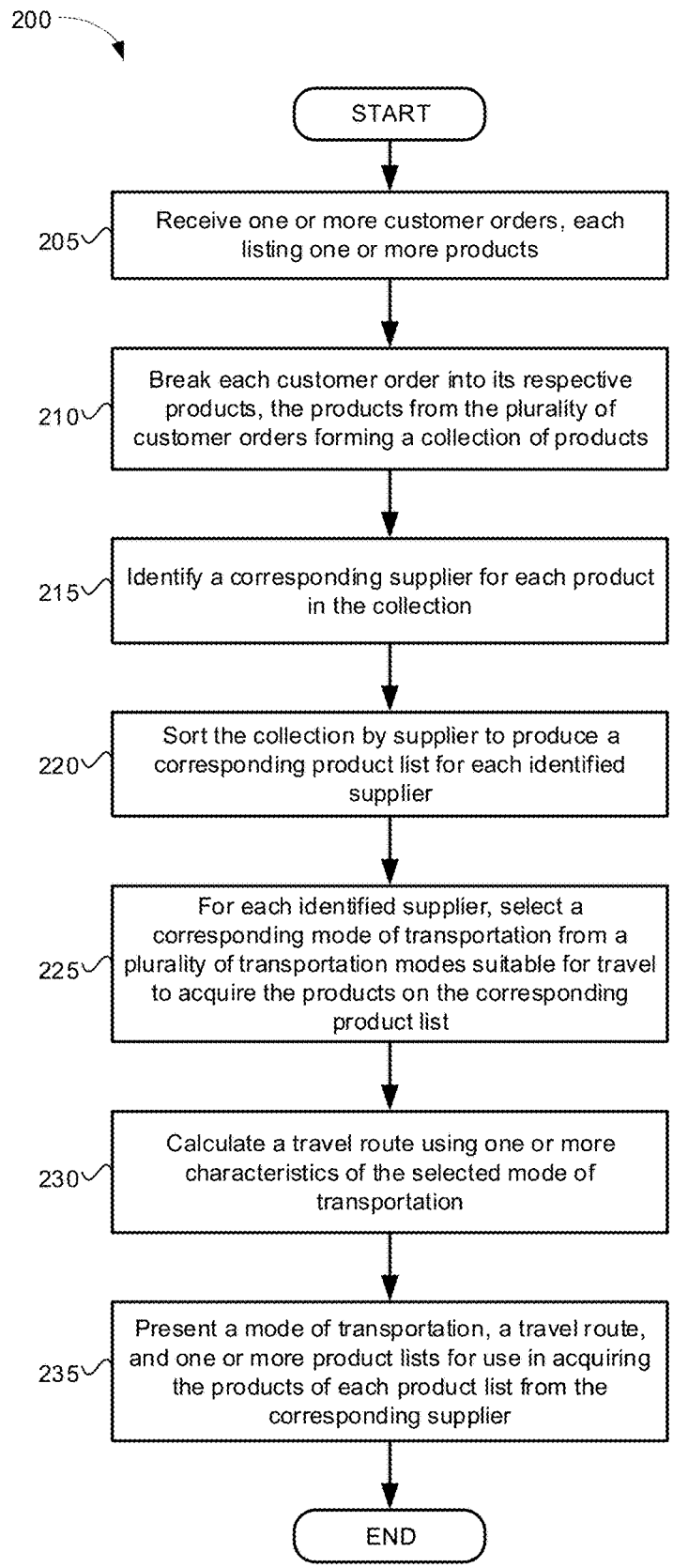
FIG. 2 shows a flowchart for an example order fulfillment method that may be implemented by the system of FIG. 1.

FIG. 2 is a high-level flowchart illustrating one example of an order fulfillment method 200 that may be implemented by the order fulfillment system 100. In general, system 100 per the method 200 may fulfill one or more customer orders received by a merchant, where some or all of the ordered products may not be available from the merchant. With respect to unavailable products, the system 100 may acquire such products from other merchants and deliver the products acquired from such other merchants along with those products that are available from the merchant to the customer.

Per the method 200, the system 100 may attempt to route vehicles 158 and/or shoppers to the various suppliers in a manner that addresses resource constraints such as, for example, the types of vehicles 158 available to the shopper(s), the weight carrying capacity of the available vehicles 158, the volume carrying capacity of the available vehicles 158, and the maximum speed of the available vehicles 158.

To this end, the e-commerce platform 150 of the system 100 may receive at 205 one or more customer orders that each include one or more products. The e-commerce platform 150 may receive the customer orders over one or more periods of time during each day such as, for example, morning (e.g., 8:00 am to 12:00 PM), afternoon (e.g., 12:00 pm to 5:00 pm), and overnight (e.g., 5:00 pm one day to 8:00 am the next day). At 210, the e-commerce platform 150 may break each customer order into its respective products, where the products from the customer orders received during a particular period may collectively form a collection of products. At 215, the commerce platform 150 may identify a corresponding supplier for each product in the collection of products. At 220, the e-commerce platform 150 may sort the collection of products by supplier to produce a corresponding product list for each identified supplier.

At 225, the e-commerce platform 150 may select a corresponding mode of transportation for each identified supplier, from a plurality of transportation modes suitable for acquiring or "picking-up" the products on the corresponding product list. Some products may be available from the merchant, while other products may be acquired from suppliers other than the merchant fulfilling the customer order. Possible modes of transportation used to acquire the products include, for example, foot, taxi, bicycle, car, truck, and unmanned drone to name just a few. At 230, the e-commerce platform 150 may calculate a travel route using one or more characteristics of the selected mode of transportation. In a representative embodiment, more than one instance of each available mode of transportation may be available and may be employed to acquire the products in the collection. The e-commerce platform 150 may calculate or otherwise determine the travel routes for each instance of each mode of transportation in use.

Finally, at 235 of FIG. 2, the e-commerce platform 150 may present the determined routes to shoppers and/or drones which are tasked with carrying out collecting products per the determined routes. In particular, the e-commerce platform 150 may provide a shopper with a mode of transportation, a travel route, and one or more product lists along with corresponding suppliers from which to acquire the respective products. For example, multiple individuals at the merchant fulfilling the orders, referred to herein as "shoppers," may each be assigned a mode of transportation and given one or more products lists, which they use to acquire the products that together are used to fulfill the collection of products and the customer orders.

It should be noted that although the flowchart of FIG. 2 does not loop so as to operate on a repeated basis, a representative embodiment of the system 100 may be arranged to employ the concepts disclosed in FIG. 2 and this disclosure in other ways. For example, the system 100 may include looping over various variables to process incoming orders from customers over a period of time such as an hour, a day, a week, a year, or any other suitable time frame.

In a representative embodiment, the e-commerce platform 150 may hold orders received from customers until designated times of the day. At those times, the products for those pending orders, that may be referred to herein as a "batch," may be acquired or gathered, in what may be referred to herein as a "shopping window." For example, in one representative embodiment, the e-commerce platform 150 may hold customer orders such that shopping for the product products of the held customer orders is performed during three "out-of-store" shopping windows. In particular, the commerce platform 150 may hold customer orders received during a first order period (e.g., 5:00 p.m. to 8:00 a.m. the following day) for out-of-store shopping during a first shopping window (e.g., 8:00 a.m. to 10:00 a.m.), hold customer orders received during a second order period (e.g., 8:00 a.m. and 12:00 p.m.) for out-of-store shopping during a second shopping window (e.g., 12:00 p.m. to 2:00 p.m.), and hold customer orders received during a third order period (e.g., 12:00 p.m. and 5:00 p.m.) for out-of-store shopping during a third shopping window from 5:00 p.m. to 7:00 p.m. It should be noted that the times given above are for illustrative purposes only, as a greater or lesser number of ordering periods and/or out-of-store shopping windows spanning other intervals of time of the day may be employed without departing from the spirit and scope of the present invention.

In the following discussion, merchants or stores may be of two types. The first type is what may be referred to herein as a "fulfillment" merchant/store. The fulfillment merchant/store may receive customer orders, and route shoppers and/or vehicles per the methods described herein. The second type of merchant/store may be referred to herein as a "supplier" or "satellite store." In the following discussion, satellite stores are not the fulfillment merchant/store for the particular customer orders, and merely act as a source of the products that the fulfillment merchant/store does not have in their available inventory.

The routing of vehicles through a set of destinations has been studied at length, and there are a number of algorithms that may be used to determine the choice of ordering of the visits to the set of destination locations. Those algorithms assume the use of one mode of transportation for travel to all of the locations in the set of travel destinations. The discussion that follows makes reference to such an algorithm referred to herein as the "savings algorithm," which may be used to develop a set of routes. Such an algorithm is described in "The savings algorithm for the vehicle routing problem," by H. Paessens, European Journal of Operational Research 34 (1988) pages 336-344, which is hereby incorporated herein by reference, in its entirety.

A representative embodiment of the system 100 goes beyond such algorithms in developing a set of routes in the presence of certain resource constraints. The algorithms to be described below enable a computer-based system such as, for example, e-commerce platform 150 to develop a set of routes for a number of shoppers and/or vehicles that are subject to various resource constraints. Such resource constraints may include the use by each shopper of one of a number of different modes of transportation, each mode of transportation having specific weight and volume carrying capacities, and speed of travel.

FIGS. 3A through 3D show a flowchart of one example of an order fulfillment method 300 implemented by the order fulfillment system 100. In particular, per the method 300, the order fulfillment system 100 may develop a set of routes for shoppers and/or vehicles that are used to acquire products from satellite stores and deliver such products to customers in accordance with a representative embodiment. The example routing method 300 of FIGS. 3A-3D may support the use of multiple different modes of transportation to acquire the products for one or more customer orders.

At 305, the system 100 may determine whether the current time corresponds to the start of a shopping window. As described above, the system 100 in a representative embodiment may define a plurality of shopping windows during which shoppers and/or vehicles acquire products from satellite stores in order to fulfill received customer orders. During such shopping windows, a shopper may travel to a satellite store to acquire the products that are not presently available at the order fulfillment store. If the system 100 determines that a shopping window is not scheduled to start at the current time, the system 100 may proceed to 310 and check whether a new customer order has been received. If one or more customer orders have been received, the system 100 at 315 may break each of the pending customer orders into their individual products, and add those products to a collection of products to be acquired during the next shopping window. The system 100 may then return to 305 in order to check again for the start of a shopping window.

Figure 3A:
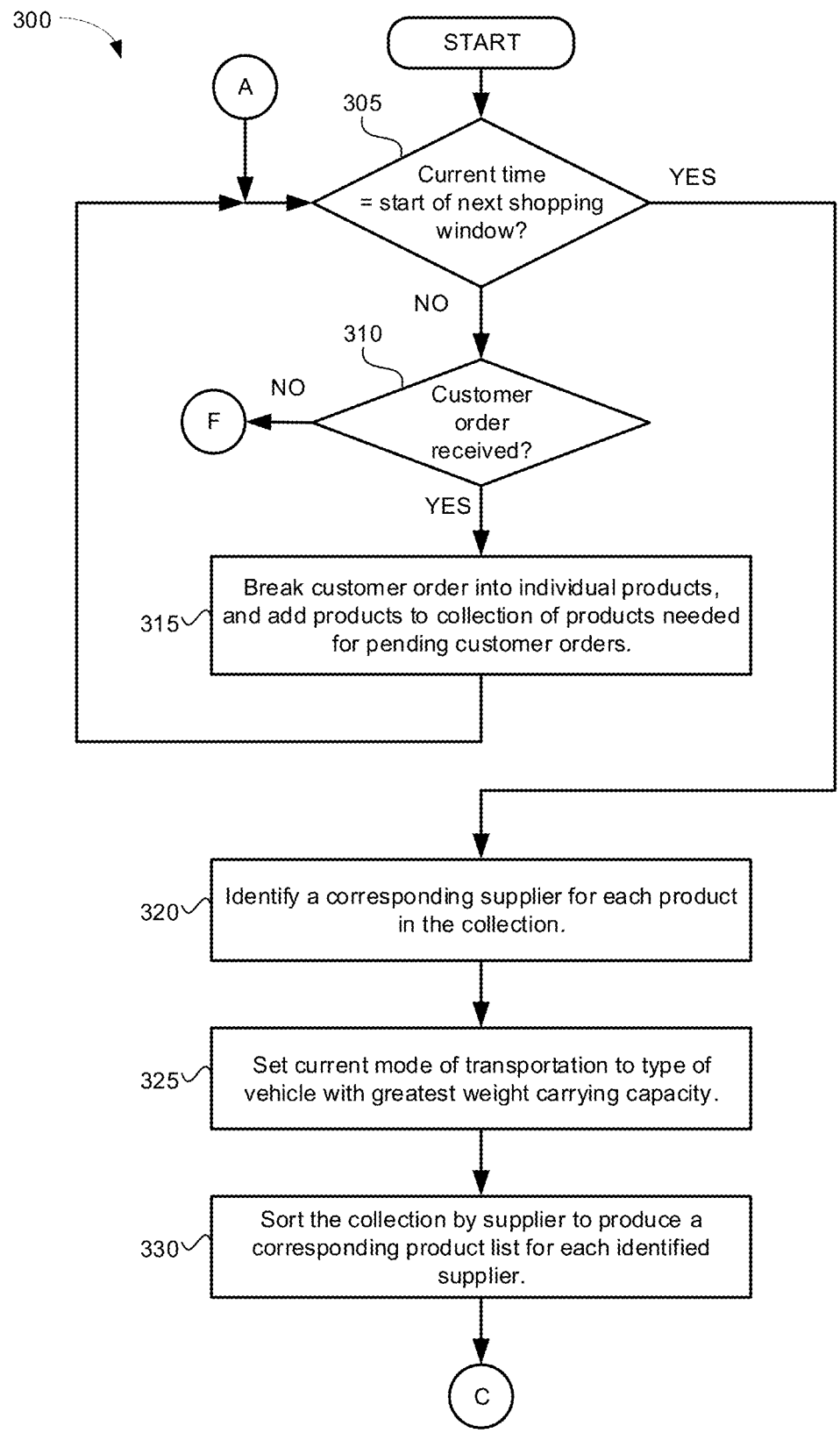
FIGS. 3A-3D shows another example order fulfillment method that may be implemented by the system of FIG. 1.
Figure 3B:
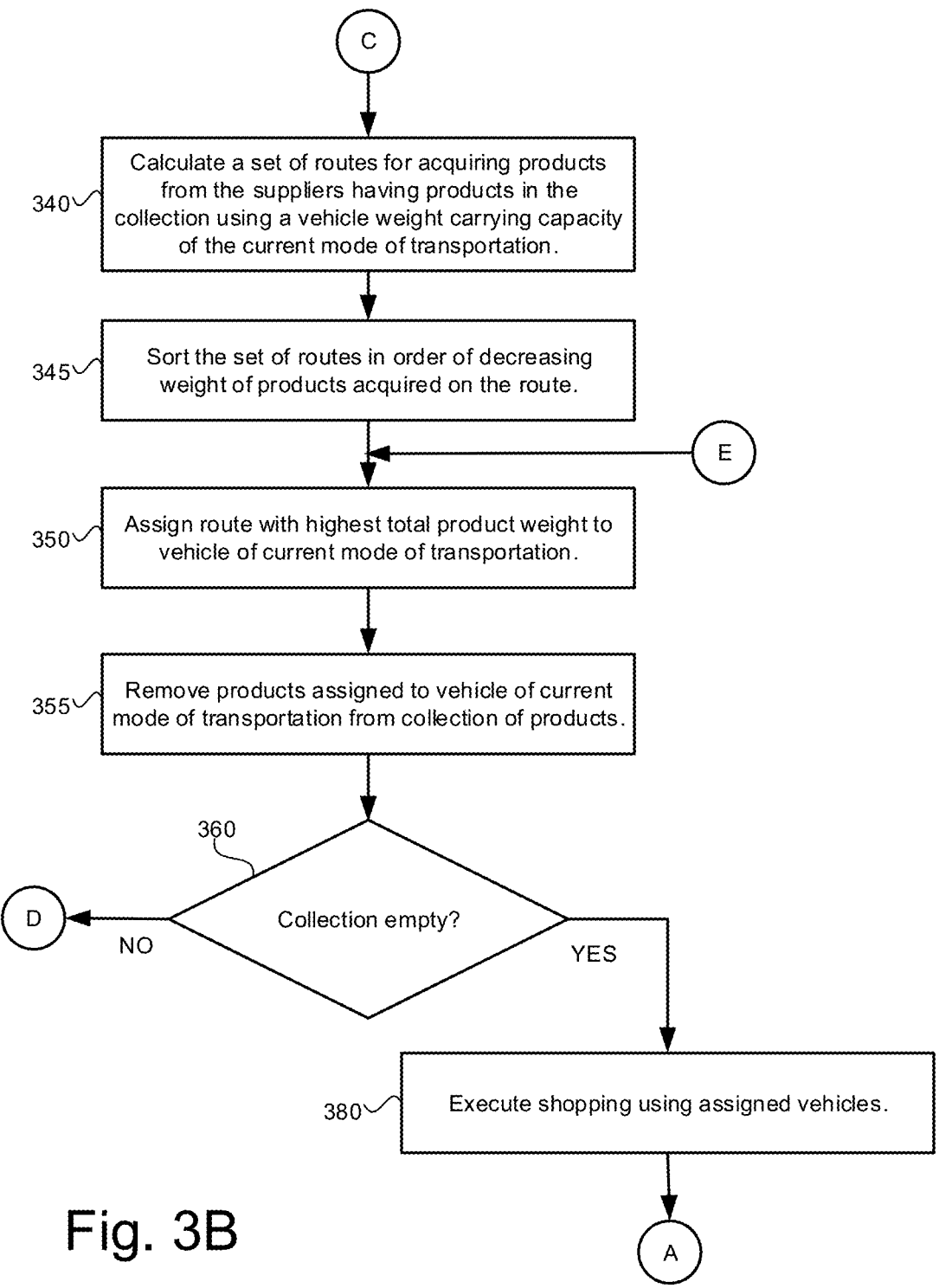
Figure 3C:
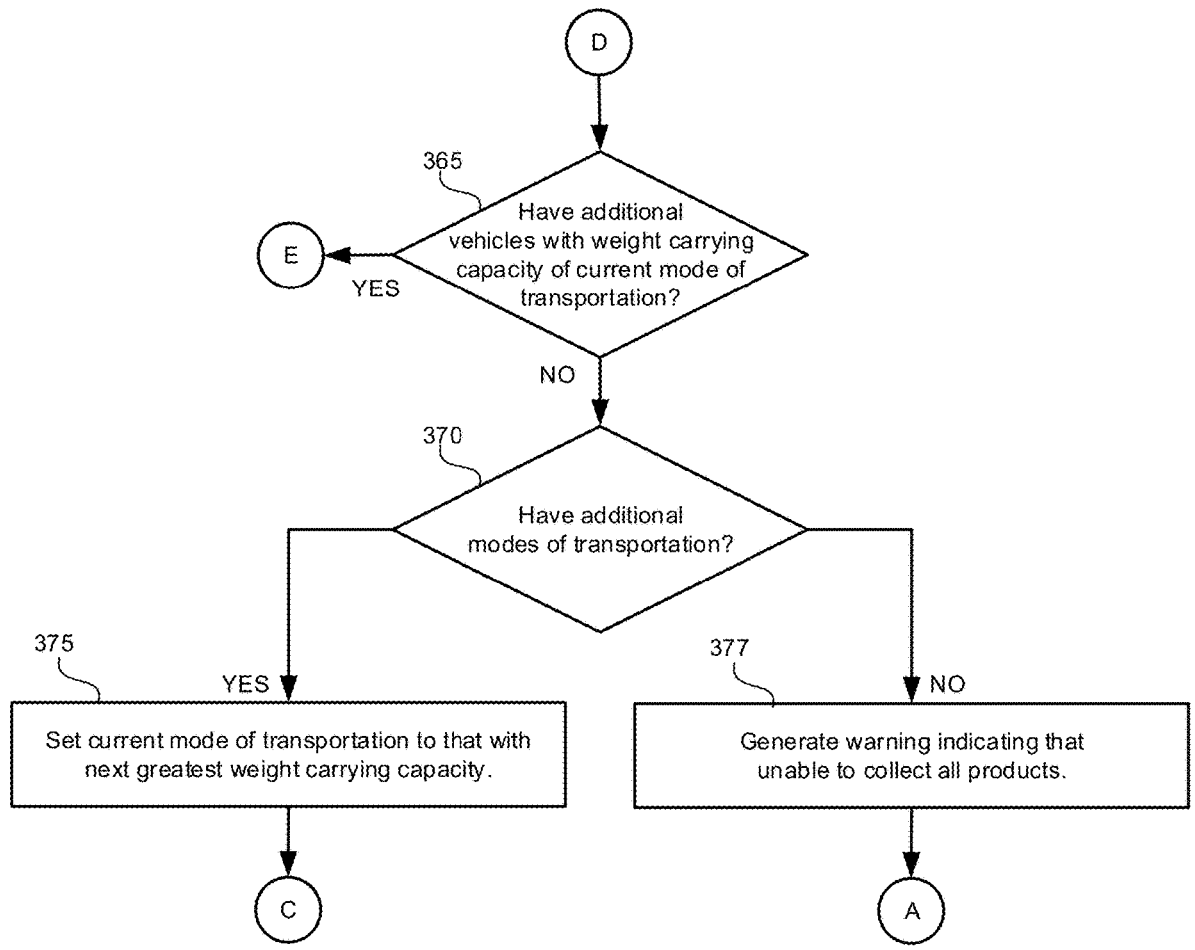
Figure 3D:
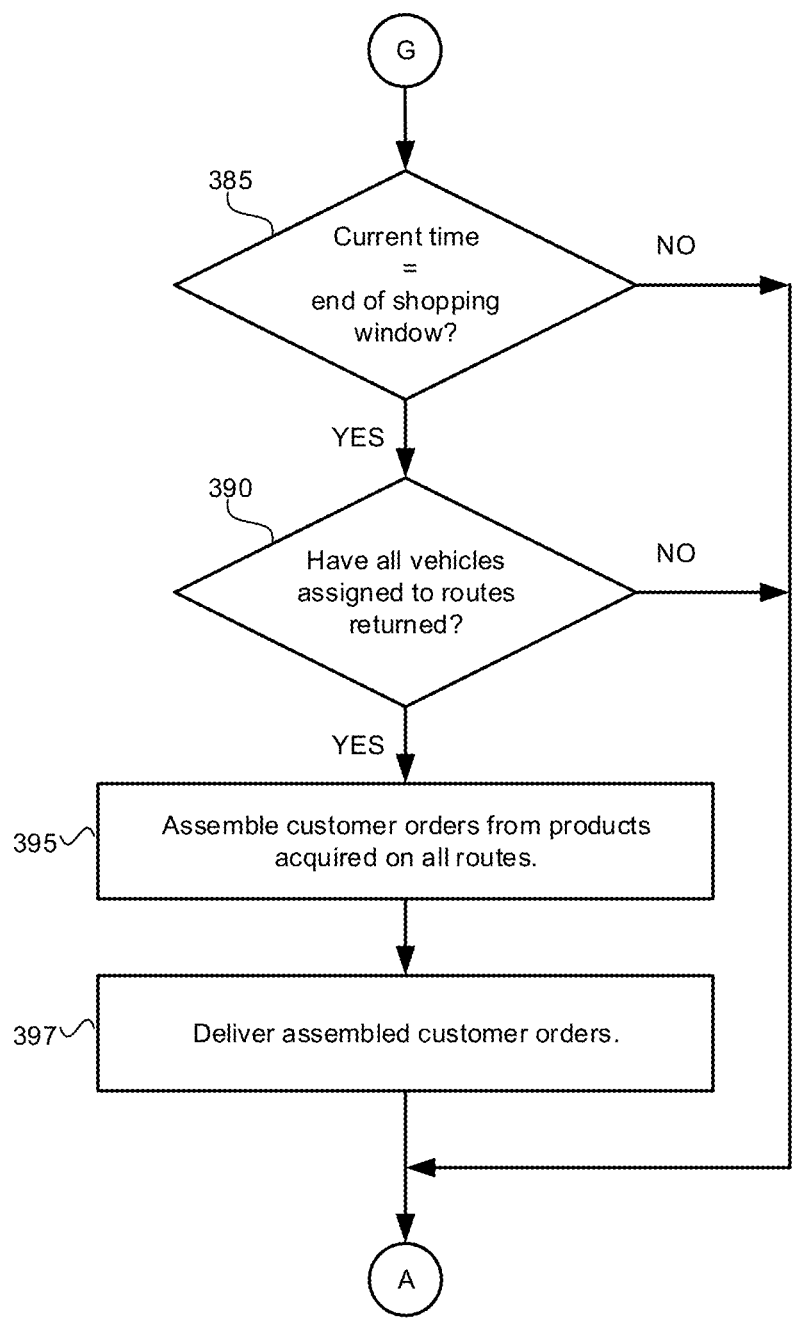

If, however, the system 100 at 310 determines that a new customer order has not been received, then the system 100 may proceed to 385 of FIG. 3D and determine whether the current time corresponds to the end of a shopping window. If the system 100 determines that current time does not correspond to the end of a shopping window, then the system 100 may return to 305 of FIG. 3A to check again for the start of a shopping window. Otherwise, the system 100 may proceed to 390 to determine whether all vehicles 158 that were assigned routes during the shopping window have returned.

If all vehicles 158 have not returned, then the system may return to 305 of FIG. 3A to check again for the start of a shopping window. Otherwise, the system 100 at 395 may assemble the customer orders associated with the shopping window using the products acquired from the satellite store and available products of the order fulfillment store. The system 100 at 397 may further schedule and/or otherwise cause the assembled orders to be delivered to the respective customers. To this end, the system 100 may cause the orders to be loaded upon delivery trucks of the order fulfillment store and scheduled for deliver to the respective customers. Alternatively and/or additional, the system 100 may provide some or all of the collected products to commercial shippers for delivery to the respective customers. After scheduling delivery of the collected products, the system 100 may return to 305 to check again for the start of a shopping window.

If the system 100 at 305 determines that a shopping window has begun, the system 100 may proceed to 320 in order to identify a corresponding supplier or satellite store for each product in the collection. The system 100 at 325 may set a current mode of transportation to the type of vehicle with the greatest weight carrying capacity. At 330, the system 100 may sort the collection by supplier or satellite store to produce a corresponding product list for each supplier or satellite store. At 340 of FIG. 3B, the system 100 may calculate a set of routes for acquiring products from suppliers or satellite stores. In particular, the system 100 may calculate the set of routes using the vehicle capacity of the current mode of transportation and the "savings method" or some other vehicle routing method. As a result of using the vehicle capacity, each generated route requires less than or equal to the capacity of the current mode of transportation.

At 345, the system 100 may sort the generated set of routes in order of decreasing weight of products acquired on the route. The system 100 at 350 may then proceed with assigning the route with the highest product weight to a vehicle 158 of the current mode of transportation. At 355, the system may remove products assigned to the vehicle 158 from the collection of products to be collected from the suppliers or satellite stores.

If after such removal of products, the system 100 determines at 360 that the collection of products is empty, then the system 100 at 380 may present information regarding the assigned routes to each of the vehicles 158 and shoppers so that the vehicles and shoppers may collect the products per their respective routes. Otherwise, the system 100 may proceed to 365 of FIG. 3C and determine whether there are additional vehicles of the current mode of transportation. If there are additional vehicles of the current mode of transportation, then the system 100 may return to 350 of FIG. 3B in order to assign the next heaviest route of the generated routes to one of the remaining vehicles of the current mode of transportation.

If there are no additional vehicles 155 of the current mode of transportation, then the system 100 at 370 may determine whether there are additional modes of transportation available. If there are additional modes of transportation available, then the system 100 at 375 may set the current mode of transportation to that with the next greatest weight carrying capacity. The system 100 may then return to 340 in order to calculate a new set of routes which use the vehicle weight carrying capacity of the newly selected mode of transportation. However, if there are no additional modes of transportation available, then the system 100 in one embodiment may generate at 377 a warning that indicates that the system 100 is unable to collect all products during the current shopping window.

Figure 4:
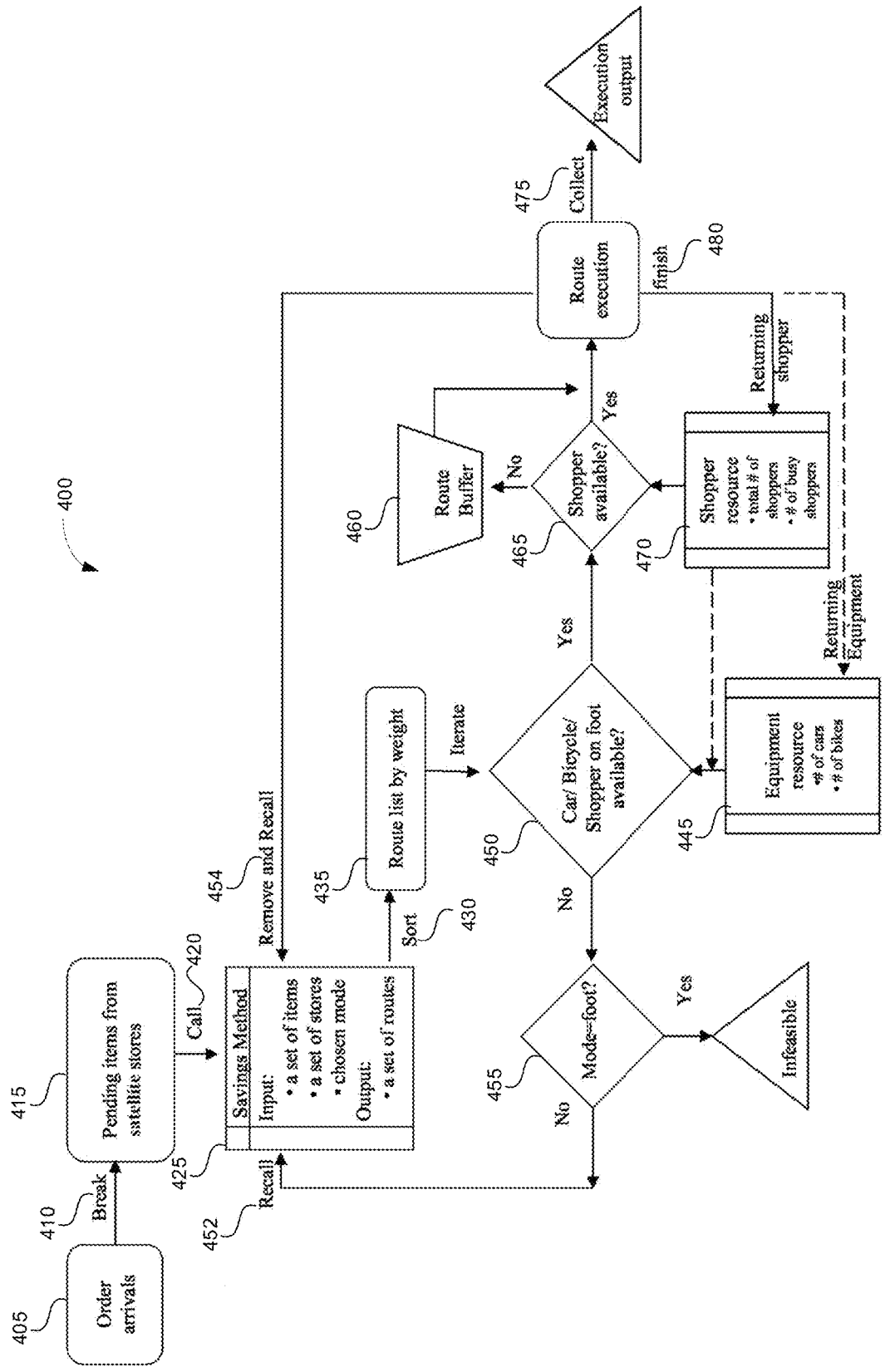
FIG. 4 provides another depiction of an order fulfillment method that may be implemented by the system of FIG. 1.
Figure 5:
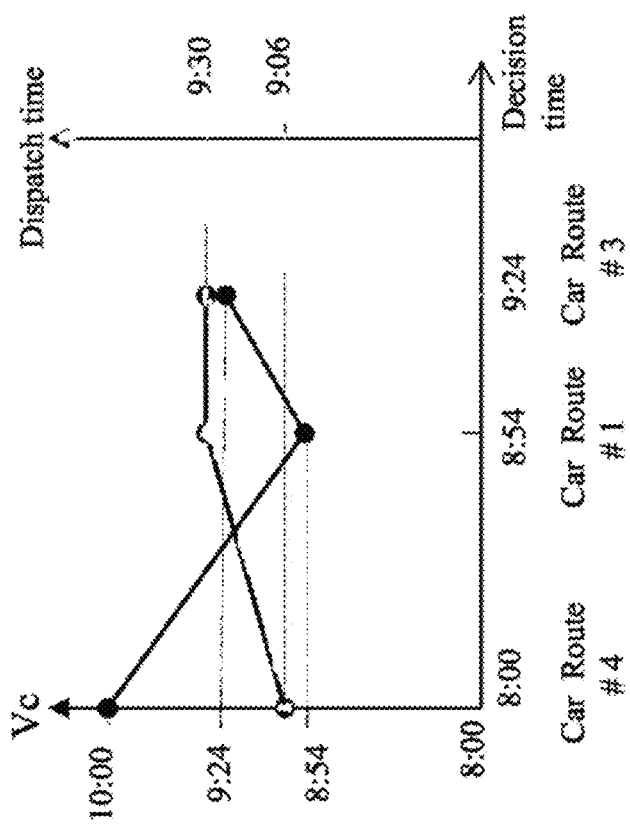
FIG. 5 depicts stacking multiple routes on a vehicle for execution during a shopping window.
Figure 5:
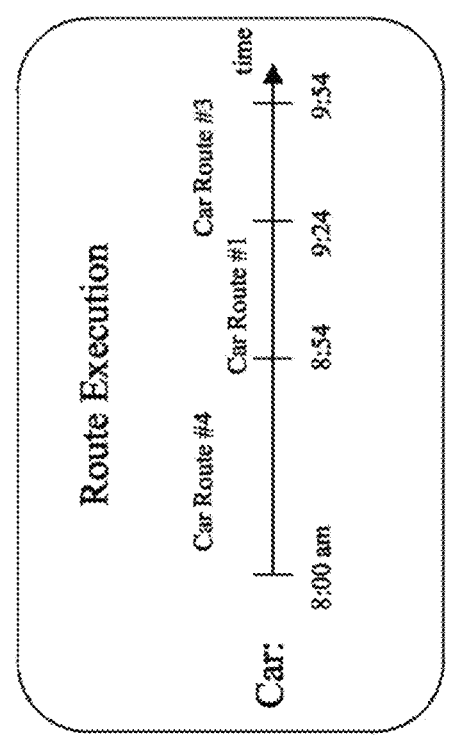
Figure 6:
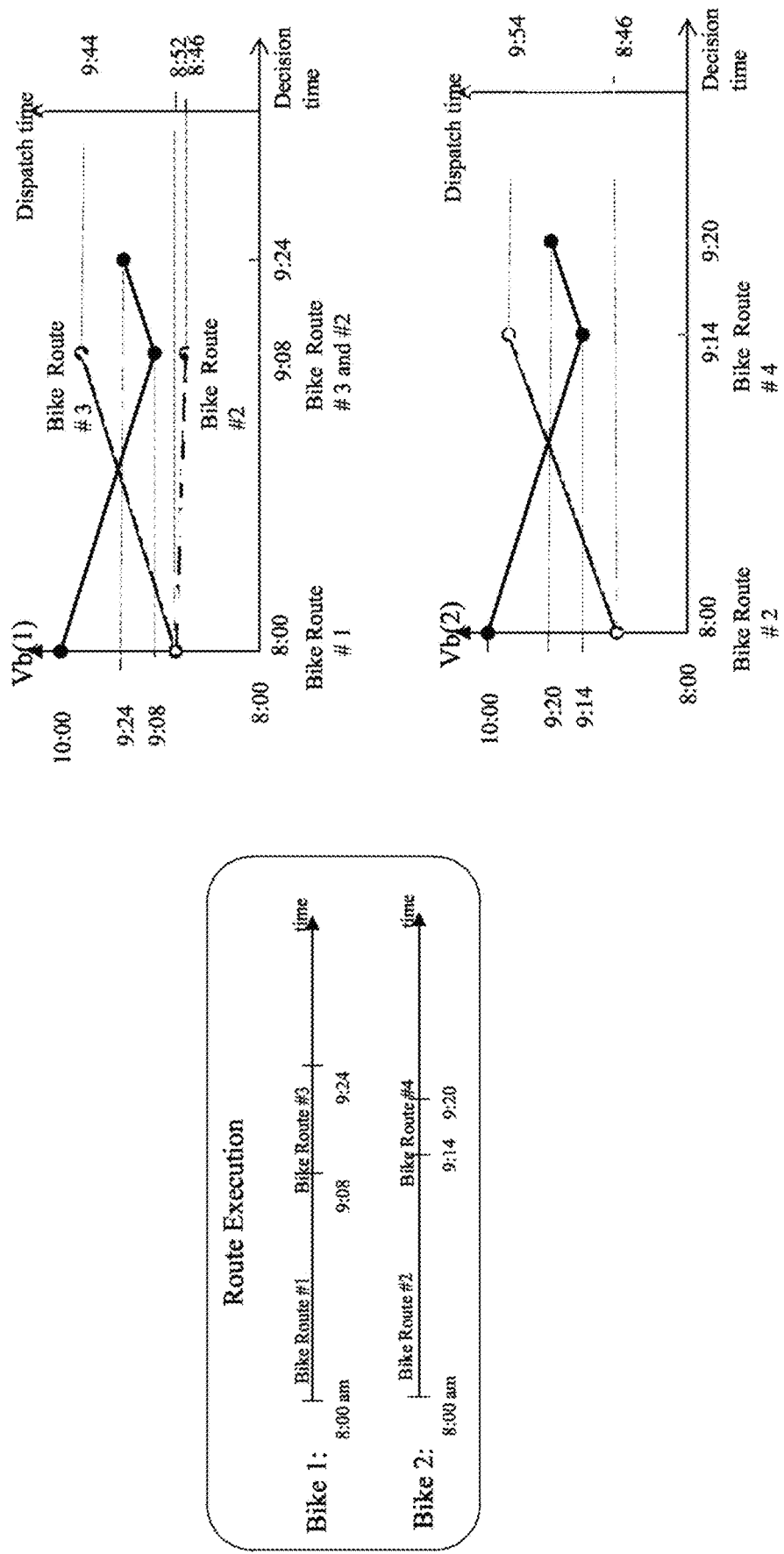
FIG. 6 depicts stacking multiple routes on multiple vehicles for execution during a shopping window.

The system 100 via the above routing method 300 assume that each vehicle 158 is assigned a single route during the shopping period. However, a vehicle 158 may be able to complete multiple routes during a single shopping window. The following with respect to FIGS. 4-6 provides an explanation of how the system 100 may stack routes upon a single vehicle 158 to obtain a better utilization of the vehicles at hand. Moreover, the system 100 via the above routing method 300 assumed there were at least as many shoppers as there were routes. The following with respect to FIGS. 4-6 further explains of how the system 100 may address the possibility of there not being an available shopper to execute the route at the time of creation.

Referring now to FIG. 4, another order fulfillment method 400 is shown, which may be used by the system 100. The order fulfillment method 400 and following description assumes three modes of transportation, car, bicycle, and foot. However, those of ordinary skill in the art readily appreciate that the method 400 may be implemented using a different number of modes of transportation as well as different types of transportation. As shown, the system 100 at 405 may receive customer orders, and break up such orders at 410 to obtain a collection of pending products 415 which are to be collected from satellite stores. The system 100 may periodically call at 420 a vehicle routing method 425 such as, for example, a savings method in order to generate a set of routes. In particular, the system 100 may use as input to the vehicle routing method 425: a set of products 415 to be collected; a set of satellite stores from which to collect the products; and a chosen mode of transportation. From such inputs, the system 100 may generate via the vehicle routing method 425 at set of routes appropriate for execution by vehicles 158 of the chosen mode of transportation.

The system 100 at 430 may sort the routes by weight to obtain a sorted list of routes 435. At 440, the system 100 may iterate through the vehicle inventory 445 to determine whether a vehicle 158 of the chosen mode of transportation is available. If a vehicle 158 is available, the system 100 may assign a route from the sorted list of routes 435 to the chosen mode of transportation. For example, given the vehicle constraint of 1 car and 5 bicycles, the system 100 may pick, in descending order by total weight, some routes from the sorted set of routes 435. In particular, given 1 car in total, the system 100 may pick a route with the highest weight and assign the chosen route to the car mode. In response to assigning the route, the system 100 may remove at 454 the products associated with the assigned route from the collection of pending products 405. The system 100 may resolve the routing problem for the remaining pending products 405 by recalling at 452 or 454 the savings method 425. If the system 100 at 455 determines there are further modes of transportation, the system 100 may repeat the process for the mode of transportation with the next heaviest weight carrying capacity. Thus, the system 100 may determine the total number of shoppers/routes needed for received customer orders. The system 100 implicitly minimizes the number of shoppers or routes since the system 100 prefers available cars to the other modes and assign routes with higher total weight to cars. Note that the above results in the system 100 causing all routes to be executed at the beginning of shopping windows. In particular, the system 100 per the above does not stack routes in a time window.

However, as explained in more detail below, the system 100 may stack routes and reuse vehicles in a shopping window. Via such stacking, the system 100 may reduce the number of shoppers needed by better utilizing faster modes of transportation. Such stacking is illustrated in FIG. 5.

Besides stacking routes, the system 100 may further account for a lack of shoppers. In particular, the system 100 may maintain a route buffer 460 to hold the pending routes. In particular, the system 100 may create a route and assign the route to a mode of transportation even though the system 100 at 465 determines that there shopper is not currently available. In particular, the system 100 may make such determination based upon a buffer or list 470 of shoppers via which the system 100 may track all shoppers. For example, the system 100 via buffer 470 may track how many shoppers are busy at any moment and when busy shoppers finish shopping and become idle. The system 100 may place created routes into the route buffer 460 if the route is produced, but cannot be executed right away. The system 100 may maintain the routes in the buffer 460 in a first-in-first-out fashion. At any time when a route is being executed 475, the system 100 may update the shopper buffer 470 to indicate that the total number of busy shoppers has increased by 1. Likewise, the system 100 may decrease the total number of busy shoppers by 1 whenever a busy shopper finishes 480 shopping and becomes idle again. At the same time, when a shopper becomes idle after coming back from shopping, the system 100 may select the first route in the route buffer 460 and assign the selected route to the newly-idled shopper. The system 100 may further record the total time the route remained in the buffer 460. By tracking the total time in the buffer 460, the system 100 may ascertain the maximum number of busy shoppers over the time horizon and the maximum waiting time. The system 100 may utilize such information to determine whether there is sufficient shoppers to meet a certain level of service or whether additional shoppers should be added.

As mentioned above, the system 100 may further stack routes over transportation vehicles. For example, the system 100 may first start with the car mode if the unit of car is positive in the vehicle inventory 445. The system 100 may solve for a solution, i.e., a set of routes, by assuming a car mode and calling the vehicle routing method 425. Then, the system 100 may iterate over the set of computed routes and schedule execution of routes through either a new route or stacking on an existing route. Next, the system 100 may remove all products/stores covered by car mode from the pending product set 415. The system 100 may then switch to the bicycle mode and resolve the problem for the remaining product in the set 415. Finally, the system 100 may repeat the process for the foot mode. The system 100 may keep stacking on existing routes and until a further route would break the shopping window limit for the vehicle mode.

For example, the system 100 may receive a stream of orders for which the vehicle routing method 425 determines may be collected using 4 routes (e.g., routes CR1, CR2, CR3, CR4) if executed via car mode. The system 100 may iterate over the 4 routes and determine that a single car may execute route CR4, then route CR1, and then route CR3 in the shopping window. See, e.g., FIG. 5. In other words, a single shopper driving a single car may come and go within the duration of the specified shopping window (e.g., 2-hour) and finish shopping routes CR4, CR1, and CR3. Thus, if system 100 has a single car at its disposal, then route CR2 cannot be executed by the car within the shopping window. In such a scenario, the products/stores associated with route CR2 remain in the pending set 405 after assigning routes to the car mode.

The system 100 may then recall the vehicle routing method 425 using bicycle mode in order to generate routes to be executed by bicycle. As a result of executing the vehicle routing method 425 using bicycle mode, the system 100 may determine that the pending product set 425 may be collected using 4 routes (e.g., routes BR1, BR2, BR3, BR4) if executed by bicycle. In particular, the system 100 may determine that routes BR1 and BR3 may be stacked and executed by a single bicycle during the shopping window. Similarly, the system 100 may determine that routes BR2 and BR4 may be executed by a single bicycle during the shopping window. Thus, instead of using 4 cars to execute the original routes CR1, CR2, CR3, CR4, the system 100 was able to assign routes to collect the pending products 415 that permitted such products to be collected within the shopping window by using a single car and two bicycles.

Although devices, methods, and systems according to the present invention may have been described in connection with a preferred embodiment, it is not intended to be limited to the specific form set forth herein, but on the contrary, it is intended to cover such alternative, modifications, and equivalents, as can be reasonably included within the scope of the invention as defined by this disclosure and appended diagrams.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. An order fulfillment system, comprising:
vehicles, wherein each vehicle corresponds to one of a plurality of modes of transportation;
an e-commerce system configured to:
  receive, during a time period, customer orders from a plurality of customers, wherein each customer order requests one or more products;
  identify, from the customer orders, a collection of products to be acquired from a plurality of suppliers;
  select a first mode of transportation from the plurality of modes of transportation;
  generate, based on a vehicle routing algorithm and a carrying capacity for the selected first mode of transportation, first routes for acquiring the collection of products from the plurality of suppliers using vehicles of the selected first mode of transportation;
  assign routes of the first routes to vehicles of the selected first mode of transportation; and
  in response to a quantity of first routes exceeding a quantity of vehicles of the selected first mode of transportation:
    identify second products of the collection of products not assigned to a vehicle;
    select a second mode of transportation from the plurality of modes of transportation;
    generate, based on the vehicle routing algorithm and a carrying capacity for the selected second mode of transportation, second routes for acquiring the identified second products in the collection from the plurality of suppliers using vehicles of the selected second mode of transportation; and
    assign routes of the second routes to vehicles of the selected second mode of transportation.

2. The order fulfillment system of claim 1, wherein the e-commerce system is further configured to:
generate the first routes based on a maximum volume carrying capacity and a maximum weight carrying capacity of the first mode of transportation; and
generate the second routes based on a maximum volume carrying capacity and a maximum weight carrying capacity of the second mode of transportation.

3. The order fulfillment system of claim 1, wherein the e-commerce system is further configured to:
sort the first routes by total weight of products to be acquired by each respective first route;
assign routes of the first routes to the vehicles of the selected first mode of transportation in decreasing order of total weight of products to be acquired via the respective first route;
sort the second routes by total weight of products to be acquired by each respective second route; and
assign routes of the second routes to vehicles of the selected second mode of transportation in decreasing order of total weight of products to be acquired via the respective second route.

4. The order fulfillment system of claim 1, wherein the e-commerce system is further configured to assign a plurality of routes from the first routes to a first vehicle of the selected first mode of transportation if the first vehicle is capable sequentially completing each of the plurality of routes within a specified shopping window.

5. The order fulfillment system of claim 1, wherein the e-commerce system is further configured to:
determine whether all of the products in the collection have been acquired from the plurality of suppliers; and
request delivery of the products to respective customers in response to determining that all of the products have been acquired.

6. A method, comprising:
receiving, with one or more computing devices during a time period, customer orders from a plurality of customers, wherein each customer order requests one or more products;
identifying, from the customer orders with the one or more computing devices, a collection of products to be acquired from a plurality of suppliers;
selecting a first mode of transportation from a plurality of modes of transportation;
generating, with the one or more computing devices based on a vehicle routing algorithm and a carrying capacity for the selected first mode of transportation, first routes for acquiring the collection of products from the plurality of suppliers using vehicles of the selected first mode of transportation;
assigning, with the one or more computing devices, routes of the first routes to vehicles of the selected first mode of transportation;
acquiring, with the one or more first vehicles, first products from the plurality of suppliers per the routes of the first routes assigned to the vehicles of the selected first mode of transportation; and
in response determining that second products of the collection remain unassigned after assigning the routes of the first routes to the vehicles of the selected first mode of transportation:
selecting a second mode of transportation from the plurality of modes of transportation;
generating, with the one or more computing devices based on the vehicle routing algorithm and the maximum carrying capacity for the selected second mode of transportation, second routes for acquiring the second products in the collection;
assigning, with the one or more computing devices, routes of the second routes to vehicles of the second mode of transportation; and
acquiring, with the vehicles of the selected second mode of transportation, the second products from the plurality of suppliers per the routes of the second routes assigned to the vehicles of the selected second mode of transportation.

7. The method of claim 6, further comprising:
generating, with the one or more computing devices, the first routes based on a maximum volume carrying capacity and a maximum weight carrying capacity of the first mode of transportation; and
generating, with the one or more computing devices, the second routes based on a maximum volume carrying capacity and a maximum weight carrying capacity of the second mode of transportation.

8. The method of claim 6, further comprising:
sorting the first routes by total weight of products to be acquired by each respective first route;
assigning routes of the first routes to the vehicles of the selected first mode of transportation in decreasing order of total weight of products to be acquired via the respective first route;
sorting, with the one or more computing devices, the second routes by total weight of products to be acquired via each respective second route; and
assigning, with the one or more computing devices, the second routes to the vehicles of the selected second mode of transportation in decreasing order of total weight of products to be acquired.

9. The method of claim 6, further comprising assigning, with the one or more computing devices, a plurality of routes from the first routes to a first vehicle of the selected first mode of transportation if the first vehicle is that capable of sequentially completing each of the plurality of routes within a specified shopping window.

10. The method of claim 6, further comprising:
determining, with the one or more computing devices, whether all of the products in the collection have been acquired from the plurality of suppliers; and
requesting, with the one or more computing devices, delivery of the products to respective customers in response to determining that all of the products have been acquired.

11. One or more non-transitory computer readable media comprising instructions that, in response to being executed, cause:
one or more computing devices to:
receive, during a time period, customer orders from a plurality of customers, wherein each customer order requests one or more products;
identify, from the customer orders, a collection of products to be acquired from a plurality of suppliers;
select a first mode of transportation from a plurality of modes of transportation;
generate, based on a vehicle routing algorithm and a carrying capacity for the selected first mode of transportation, first routes for acquiring the collection of products from the plurality of suppliers using vehicles of the selected first mode of transportation;
assign routes of the first routes to vehicles of the selected first mode of transportation; and in response to a quantity of first routes exceeding a quantity of vehicles of the selected first mode of transportation, to:
  identify second products of the collection of products not assigned to a vehicle;
  select a second mode of transportation from the plurality of modes of transportation;
  generate, based on the vehicle routing algorithm and a carrying capacity for the selected second mode of transportation, second routes for acquiring the identified second products in the collection from the plurality of suppliers using vehicles of the selected second mode of transportation; and
  assign routes of the second routes to vehicles of the selected second mode of transportation.

12. The one or more non-transitory computer readable media of claim 11, wherein the instructions further cause the one or more computing devices to:
  generate the first routes based on a maximum volume carrying capacity and a maximum weight carrying capacity of the first mode of transportation; and
  generate the second routes based on a maximum volume carrying capacity and a maximum weight carrying capacity of the second mode of transportation.

13. The one or more non-transitory computer readable media of claim 11, wherein the instructions further cause the one or more computing devices to:
  sort the first routes by total weight of products to be acquired by each respective first route;
  assign routes of the first routes to the vehicles of the selected first mode of transportation in decreasing order of total weight of products to be acquired via the respective first route;
  sort the second routes by total weight of products to be acquired by each respective second route; and
  assign routes of the second routes to vehicles of the selected second mode of transportation in decreasing order of total weight of products to be acquired via the respective second route.

14. The one or more non-transitory computer readable media of claim 11, wherein the instructions further cause the one or more computing devices to assign a plurality of routes from the first routes to a first vehicle of the selected first mode of transportation if the first vehicle is capable of sequentially completing each of the plurality of routes within a specified shopping window.

15. The one or more non-transitory computer readable media of claim 11, wherein the instructions further cause the one or more computing devices to:
  determine whether all of the products in the collection have been acquired from the plurality of suppliers; and
  request delivery of the products to respective customers in response to determining that all of the products have been acquired.

16. The order fulfillment system of claim 1, wherein the e-commerce system is configured to place routes of the first routes in a buffer for later fulfillment by a shopper who mans a vehicle of the selected first mode of transportation.

17. The order fulfillment system of claim 1, wherein the vehicle routing algorithm includes a savings algorithm.

18. The method of claim 6, further comprising placing routes of the first routes in a buffer for later fulfillment by a shopper who mans a vehicle of the selected first mode of transportation.

19. The method of claim 6, wherein the vehicle routing algorithm includes a savings algorithm.

20. The one or more non-transitory computer readable media of claim 11, wherein the vehicle routing algorithm includes a savings algorithm.

* * * * *